March 15, 1949. H. J. SIEKMANN ET AL 2,464,619
HEADSTOCK TRANSMISSION CONTROL FOR LATHES
Filed Jan. 18, 1945 9 Sheets-Sheet 8
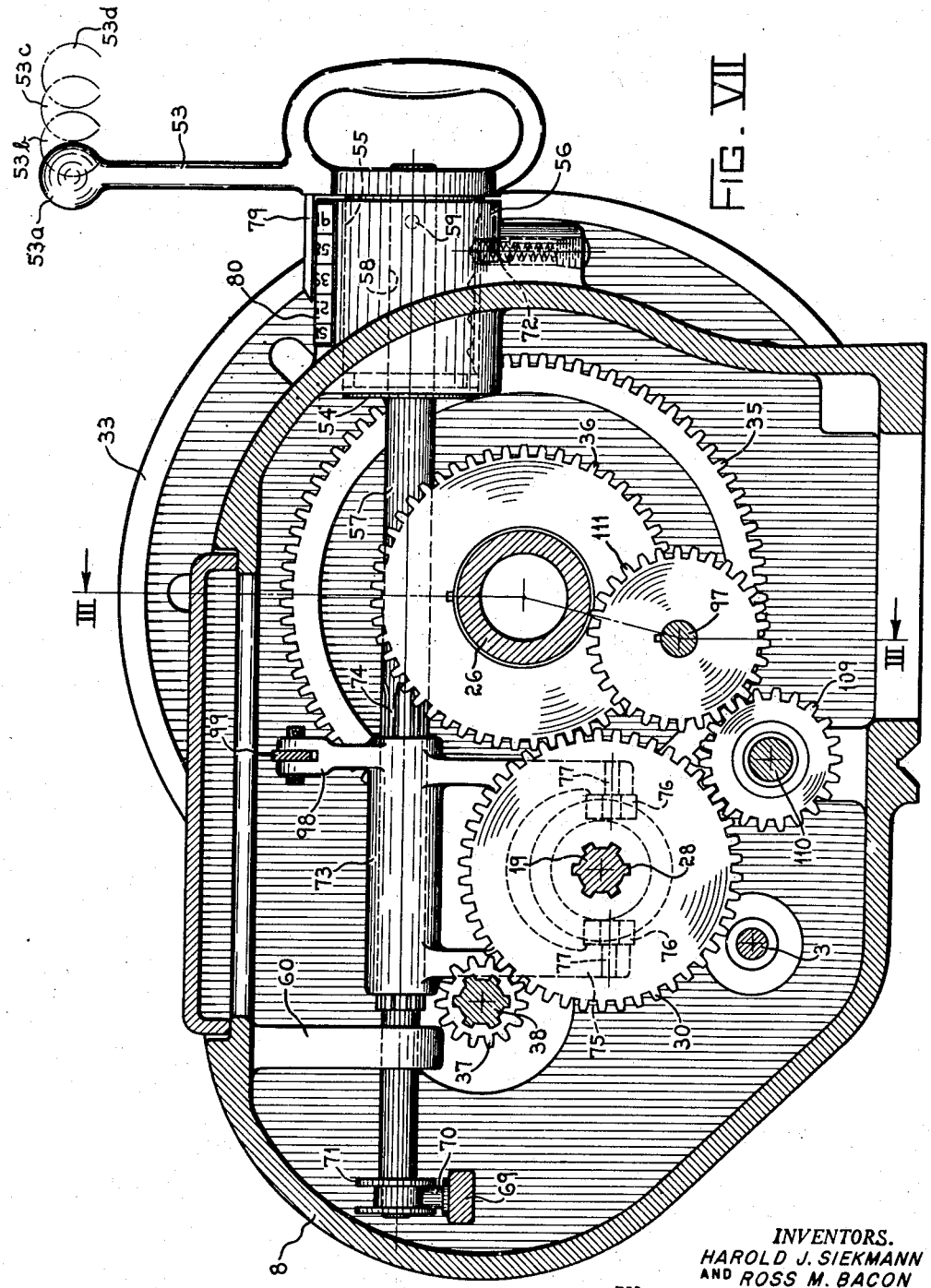
FIG. VII
INVENTORS.
HAROLD J. SIEKMANN
AND ROSS M. BACON
BY
Toulmin & Toulmin
ATTORNEYS.

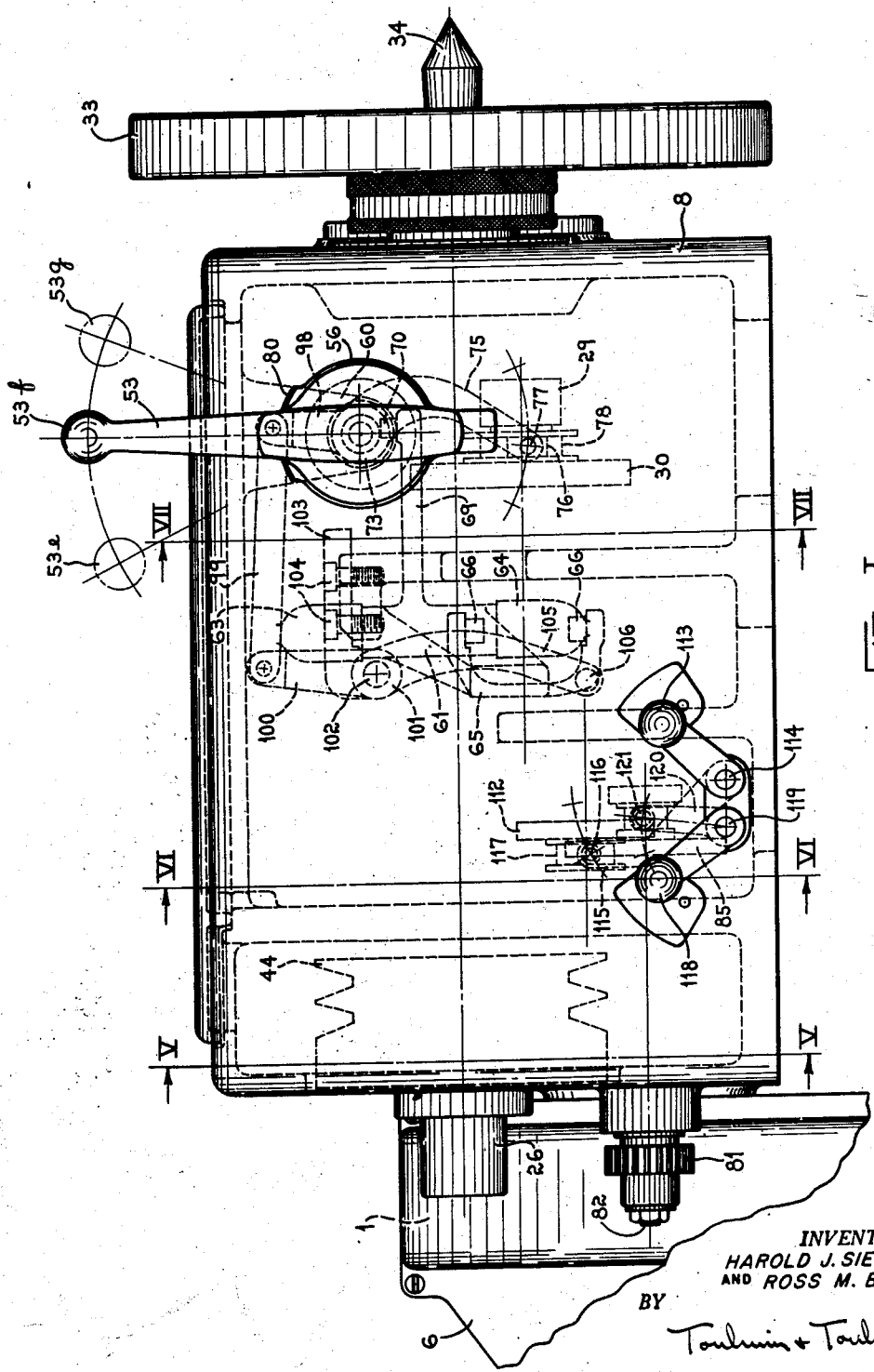

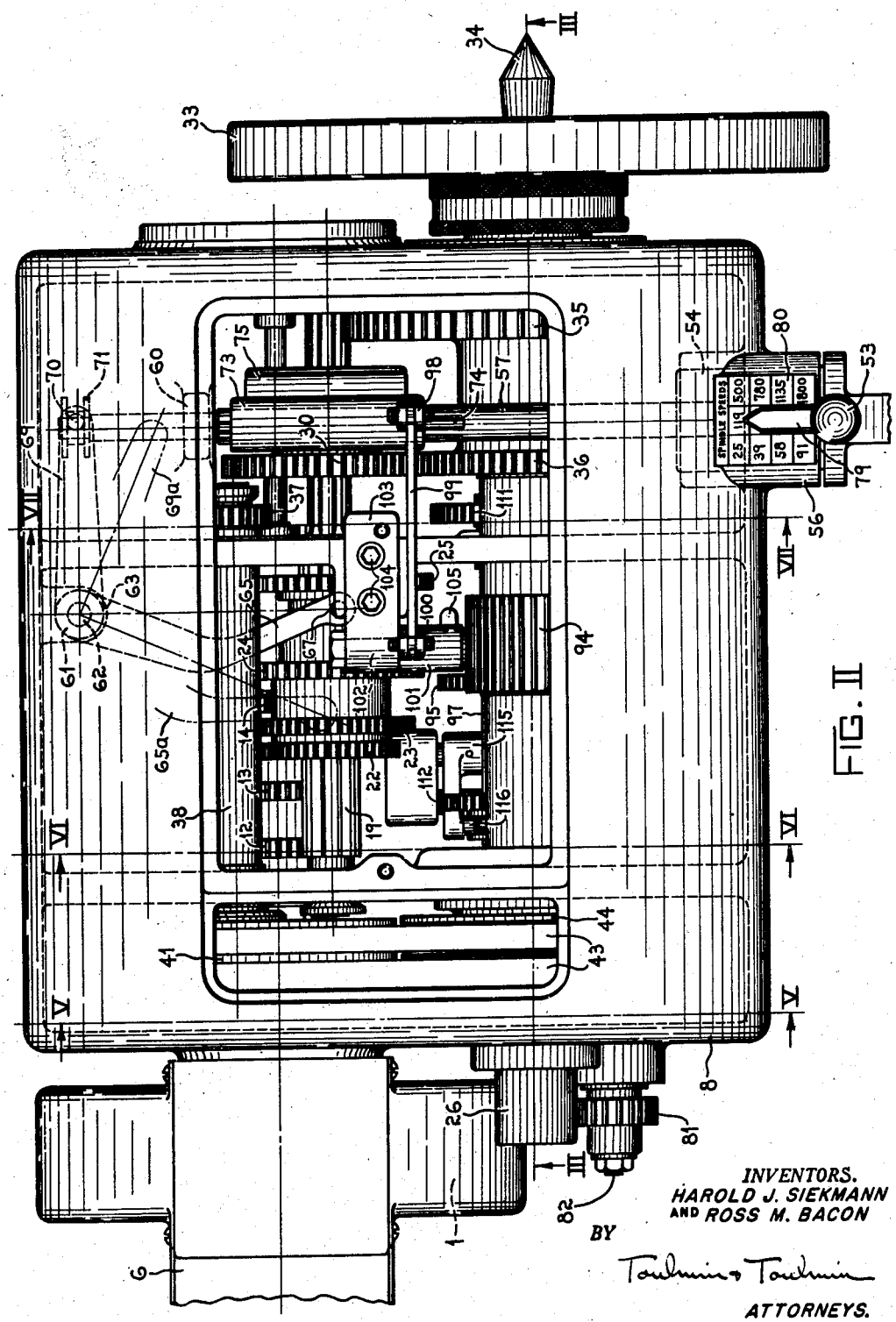

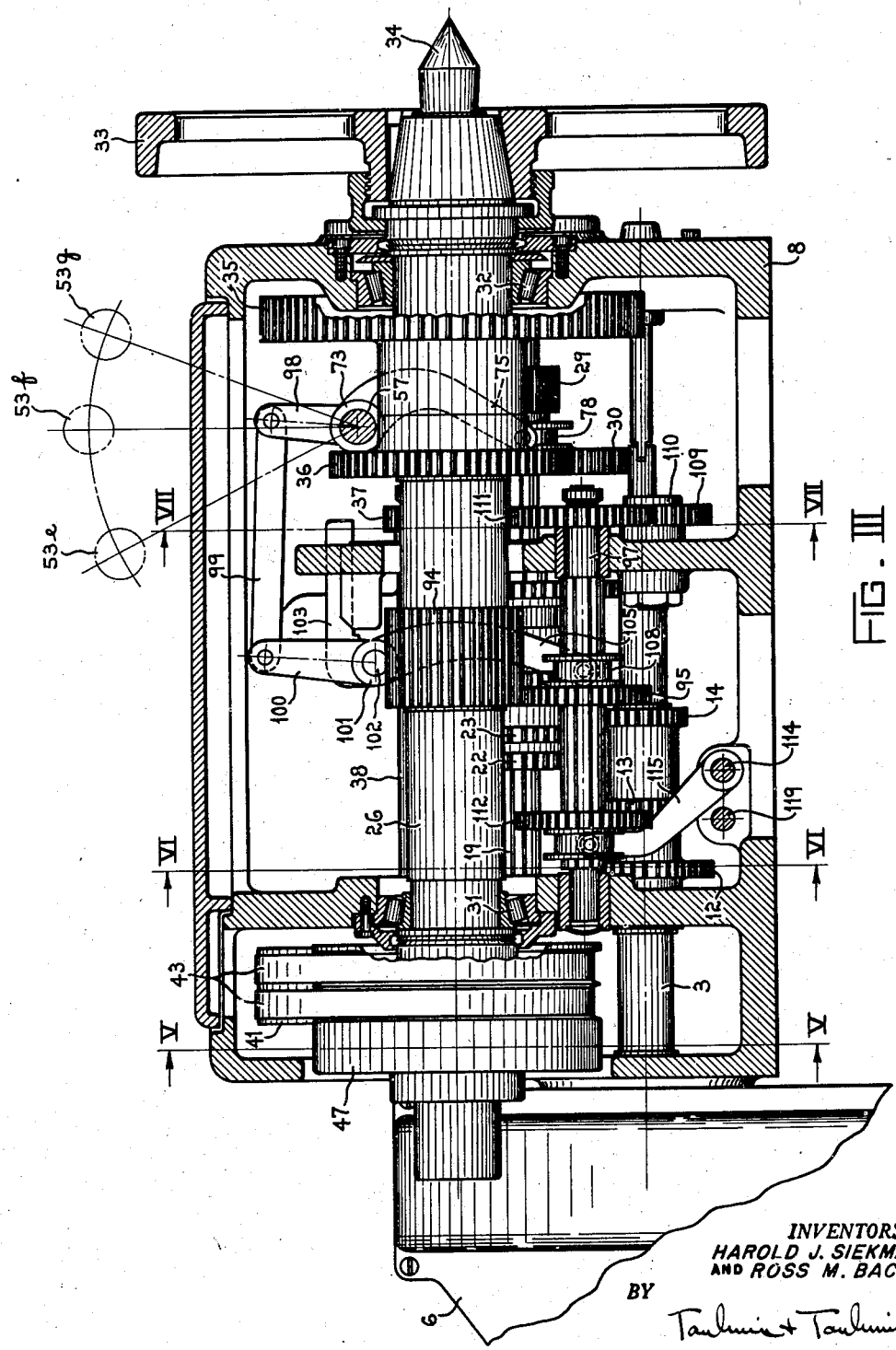

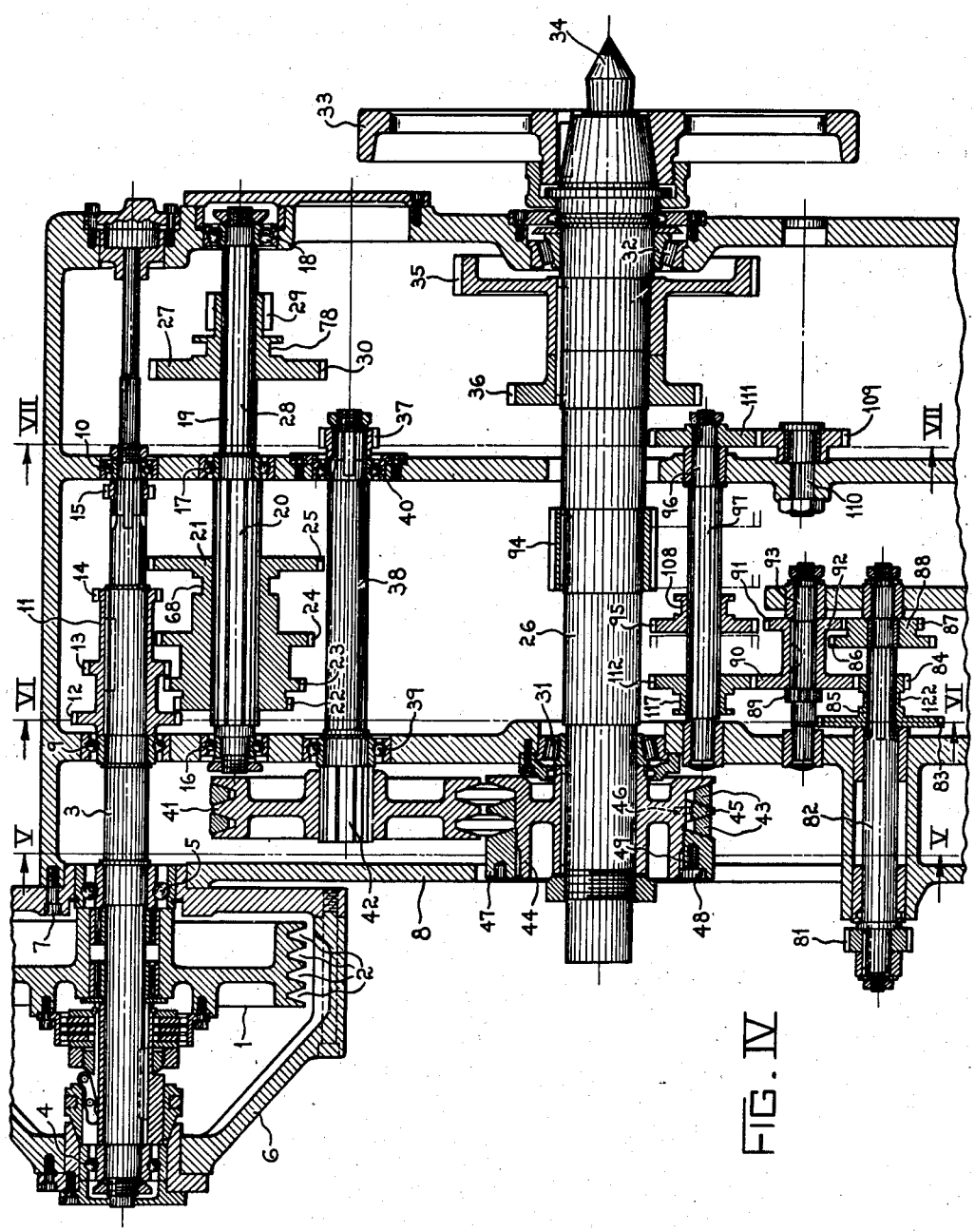
FIG. IV

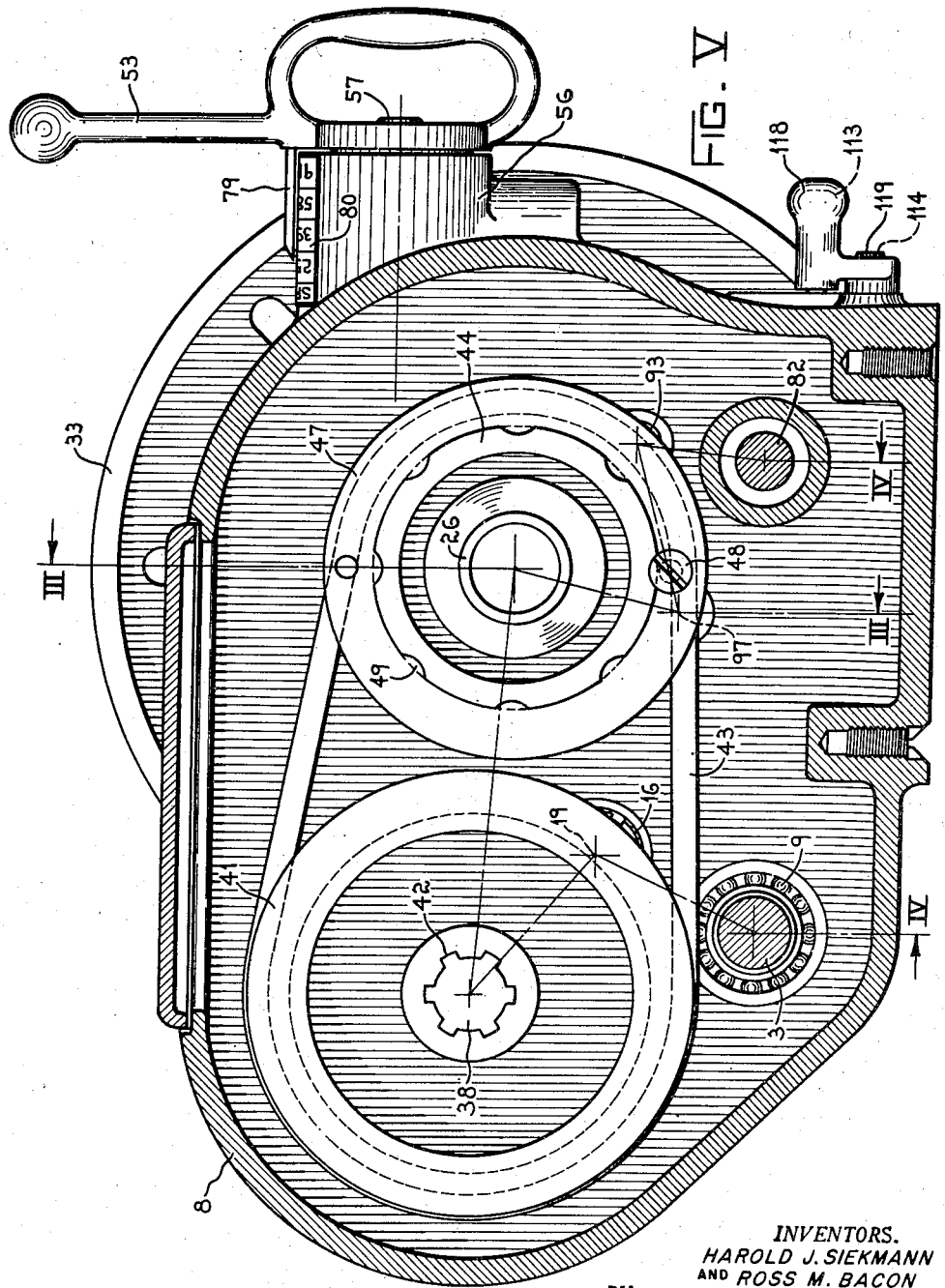

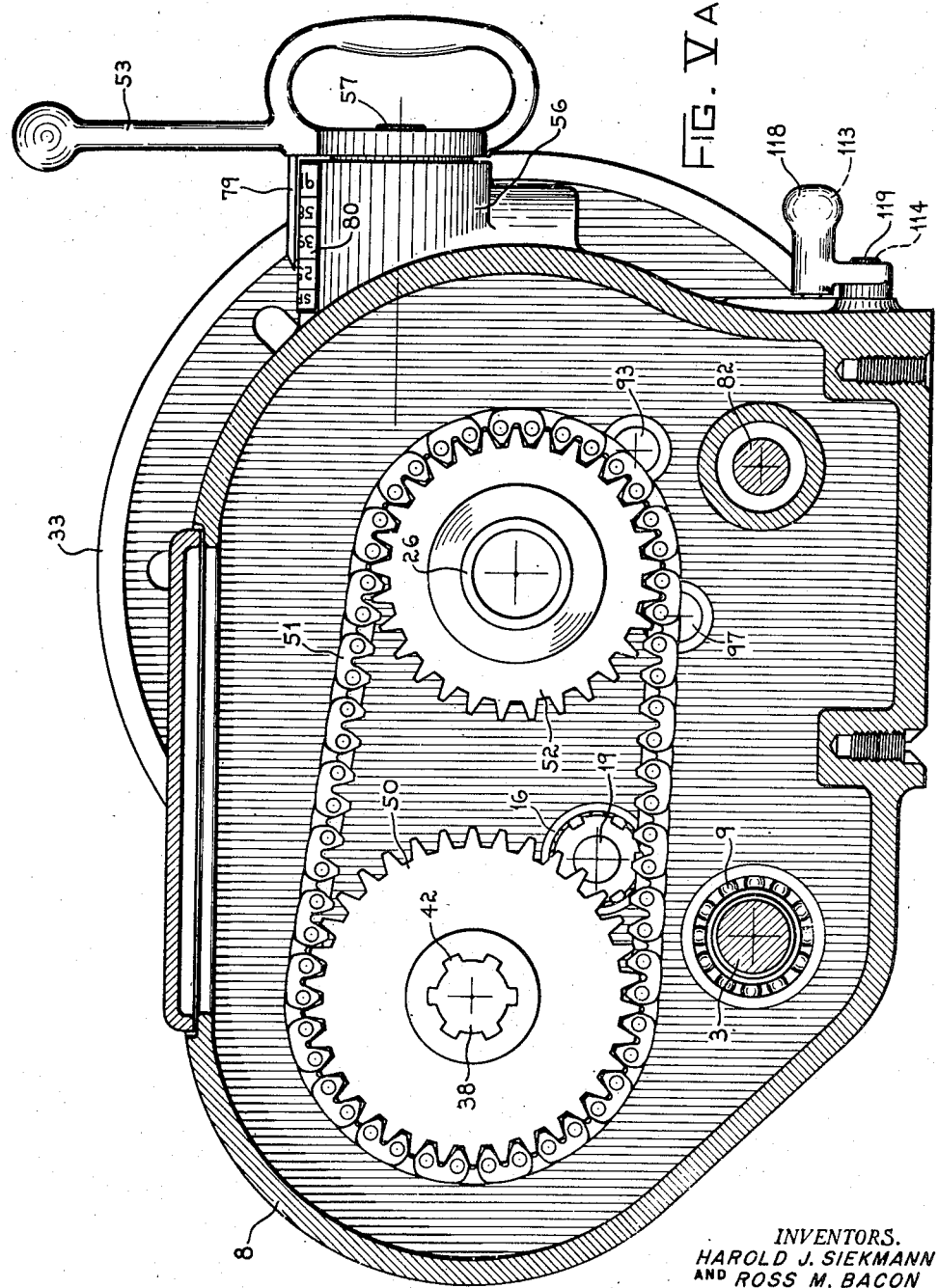

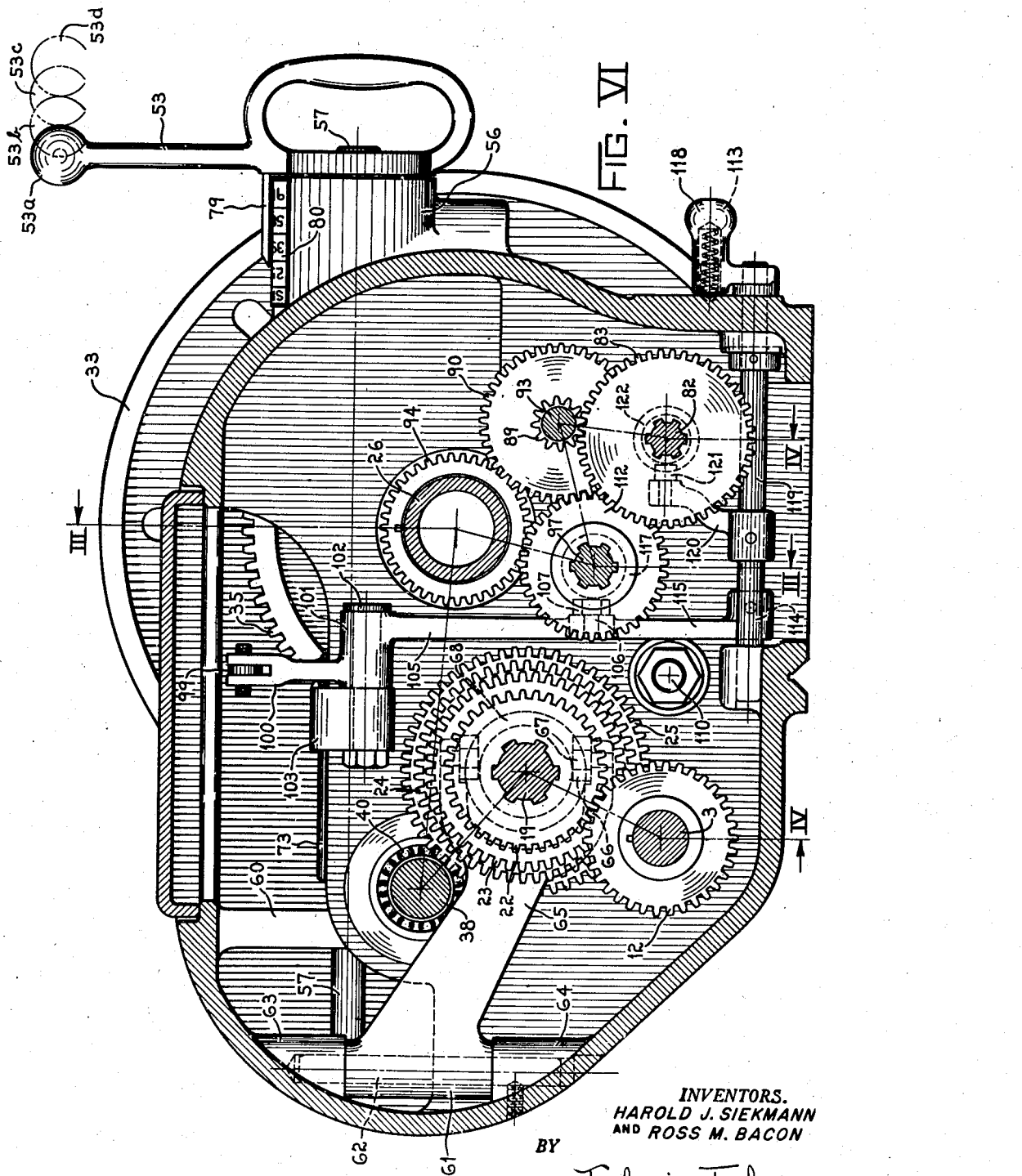

March 15, 1949.  H. J. SIEKMANN ET AL  2,464,619
HEADSTOCK TRANSMISSION CONTROL FOR LATHES
Filed Jan. 18, 1945  9 Sheets-Sheet 9
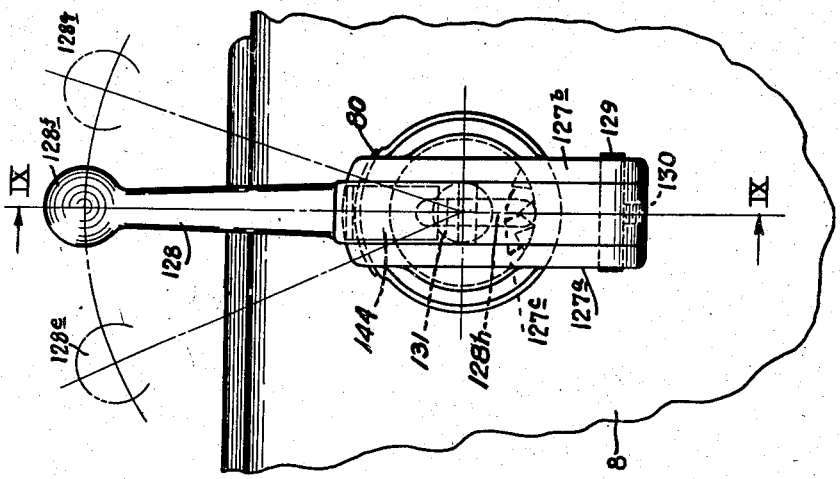
FIG. VIII
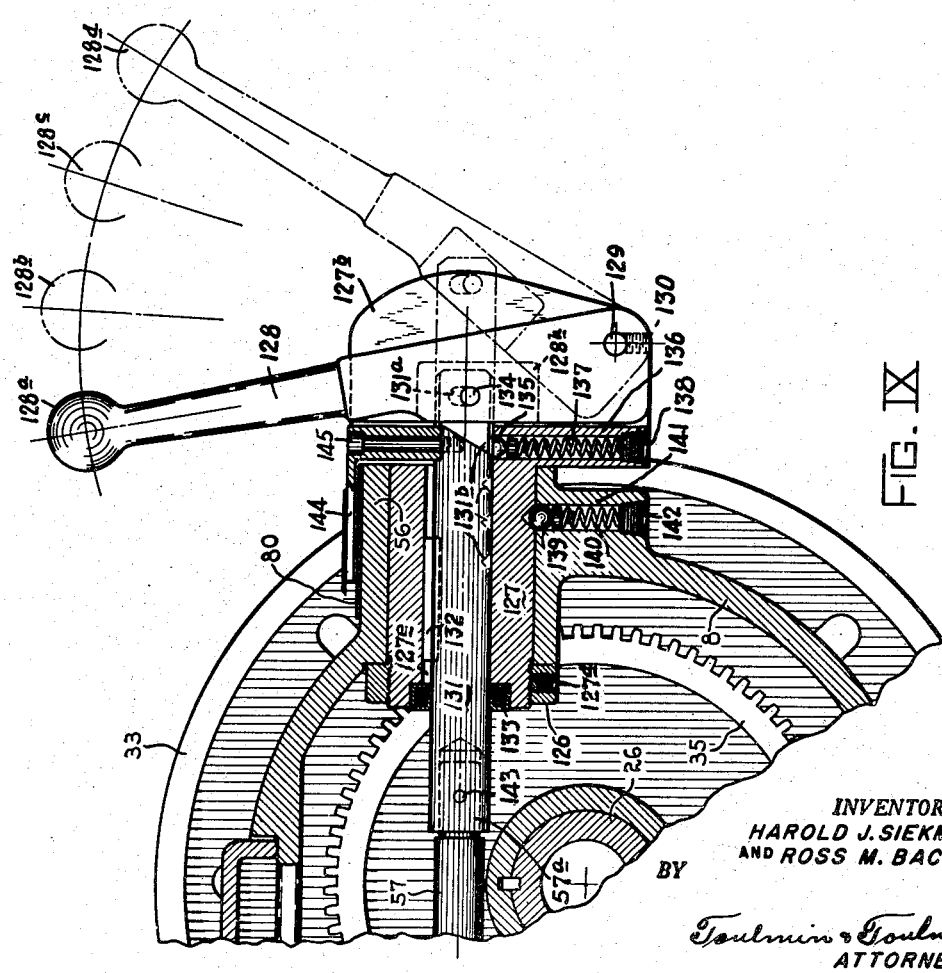
FIG. IX
INVENTORS.
HAROLD J. SIEKMANN
AND ROSS M. BACON
BY
Toulmin & Toulmin
ATTORNEYS.

Patented Mar. 15, 1949

2,464,619

UNITED STATES PATENT OFFICE 2,464,619

HEADSTOCK TRANSMISSION CONTROL FOR LATHES

Harold J. Siekmann and Ross M. Bacon, Cincinnati, Ohio, assignors to The R. K. LeBlond Machine Tool Co., Cincinnati, Ohio, a corporation of Delaware Application January 18, 1945, Serial No. 573,321

11 Claims. (Cl. 74—333)

1

This invention relates to improvements in headstocks for lathes.

It is an object of our invention to provide a headstock affording a wide range of speeds wherein all speeds are selected by movement of a single control element.

Another object is to provide a headstock affording a range of slower gear drives, together with a range of high speed belt drives so that the machine will be suitable for a large variety of uses.

A further object is to provide a lathe as in the immediately foregoing paragraph wherein a feed drive is incorporated; connected to be driven by alternative drives affording the correct feeding speeds for each selected spindle speed.

A still further object is to provide a headstock as in the immediately preceding paragraph, wherein, when one of the high speed belt-drive spindle speeds is selected, the feeding speed in relation to the spindle speed, is automatically reduced whereby inadvertent adjustment and consequent damage to the machine are obviated.

Another object is to provide alternative feeding drives, one from the headstock spindle for relatively slow spindle speeds, and a second from the headstock change gear drive for high spindle speeds.

Other objects and advantages of our invention will become apparent as the description proceeds.

In the drawings:

Figure I is a front elevational view of a headstock showing the control lever for effecting various speed adjustments as well as the levers for changing the feeding speed and the direction of feeding;

Figure II is a plan view of a headstock with the top cover removed to show the arrangement of gears therein;

Figure III is a vertical longitudinal section through the headstock taken along line III—III of Figures II, V, VI and VII;

Figure IV is a diagrammatic expanded section through the headstock taken along line IV—IV of Figures V and VI showing the change speed gearing and the alternative belt and gear drives to the spindle as well as the alternative drives to the feed shaft;

Figure V is a vertical transverse section through the headstock taken along line V—V of Figures I, II, III and IV showing the speed adjustment handle and the high speed belt drive for the spindle;

Figure Va is a vertical transverse section similar to that of Figure V but showing a link-belt spindle drive in substitution for the V-belt drive of Figure V;

Figure VI is a vertical transverse section through the headstock taken along line VI—VI of Figures I, II, III and IV showing the shifting mechanism for the change speed gearing and the feed gearing;

Figure VII is a vertical transverse section through the headstock taken along line VII—VII of Figures I, II, III and IV showing the construction of the single control lever and the mechanism by which it affects changes in spindle speeds.

Figure VIII is a front elevational view showing a modified mounting for the control lever for effecting speed adjustments, and Figure IX is a sectional view taken on the line IX—IX of Figure VIII showing the detailed construction for mounting the control shaft for axial and rotational movements and releasably holding it in its several positions of adjustment.

Referring particularly to Figure IV, the headstock housing 8 has a drive shaft 3 journaled in rib portions 8a and 8b thereof, as by bearings 9 and 10. Shaft 3 is journaled exteriorly of housing 8 in bearings 4 and 5 carried by a bracket 6 attached to housing 8 by screws 7. A pulley 1, grooved for a belt drive as at 2, is journaled upon a portion of shaft 3 within bracket 6 and is adapted for connection and disconnection with shaft 3 by means of a conventional clutch mechanism indicated generally at 1a and adapted to be actuated and controlled by a collar 3a slidable on shaft 3 in a manner well known in the art and as shown, for example, in the patent to Groene, 1,878,495, September 20, 1932.

Within housing 8, shaft 3 has affixed thereto the triple gear 11 including gears 12, 13 and 14. A small pinion 15 is also fixed to a splined portion of shaft 3 adjacent bearing 10. An intermediate shaft 19 is journaled within housing 8 on three bearings 16, 17 and 18. This shaft is splined as at 20 between rib portions 8a and 8b and a quadruple gear 21 has a splined internal bore fitting shaft 20 whereby integrally formed gears 22, 23, 24 and 25 of gear 21, may be selectively brought into mesh with gears 12, 13, 14 or 15, respectively, as will be clear from inspection of Figure IV. The portion of shaft 19, between rib 8b and the adjacent headstock housing 8 has a splined portion 26 of reduced size, upon which a compound gear 27, having a correspondingly splined bore, is slidable. Gear 27 consists of a gear 30, a pinion 29 and an intermediate collar having a shifting slot 78. By appropriate sliding of gear 21 by means subsequently described, shaft 19 may be selectively rotated at any one of four different speeds.

A pulley shaft 38 is journaled by bearings 39 and 40 in portions 8a and 8b, respectively. This shaft has a splined section 42 at one end and a pinion 37 fixed to its other end. A pulley 41 having its periphery grooved for belt driving, is mounted for rotation with shaft 38 by means of a bore splined to fit section 42.

Spindle 26 is journaled at its rearward end by a bearing 31 carried in rib portion 8a, and at its forward end by a bearing 32 carried in the forward headstock housing wall. At its rearward end, spindle 26 has a belt pulley 44 fixed thereto. It also has a pinion 94 fixed to its mid-portion, and a large face gear 35 and smaller gear 36, fixed on its forward end.

Compound gear 27 is slidable by means subsequently described, into any one of three positions; first, wherein pinion 29 meshes with face gear 35 to provide, in connection with gears 11 and 21 a range of four slow powerful back gear drive speeds needed for heavy roughing cuts and for turning work of relatively large diameter; secondly, wherein gear 30 is meshed with gear 36 to provide, in connection with gears 11 and 21, a range of four intermediate spindle speeds; and thirdly, wherein gear 30 is brought into mesh with pinion 37 upon shaft 38 to drive pulleys 41, 44 and spindle 26, in connection with gears 11 and 21, over a range of four high spindle speeds. A range of twelve spindle speeds is thus provided which, for example, may be variously distributed between a low of 25 and a high of 1800 R. P. M.

In view of the fact that the axes of spindle 26 and of shaft 38 are relatively fixed, we have provided a novel means for adjusting the tension of V-belts 43. As shown at Figure IV, the pulley 44 is formed with an integral circumferential rib 44a forming one side of one V-groove. An inner ring 45 fits a cylindrical portion of pulley 44 and is triangular in cross-section to form the adjacent faces of the V-grooves. This ring has one or more axially extending slots or keyways on its inner periphery within which fits the protruding end of a pin 46 fixed in the adjacent surface of pulley 44 whereby the ring may have a slight adjustment axailly of pulley 44, but is fixed against rotation relatively thereto. A second ring 47 has one side beveled to form the remaining side of the outer or rearward pulley groove. This ring is screw-threaded on the pulley, as shown at Figure IV, and may be locked in a selected position of rotative adjustment by means of a screw 48 in pulley 44, adapted to engage counterbores 49 in ring 47.

When it is desired to tighten belts 43, screw 48 is loosened and ring 47 is turned down on pulley 44. This causes proportional shifting of ring 45, decreases the effective width of the pulley grooves, and causes belts 43 to ride at a greater radial distance from the spindle axis. As a result, the belts are tightened and, since pulley 41 is splined upon shaft 38, it immediately adjusts its longitudinal position in accordance with the new adjustment whereby both belts run true at all times. Likewise, the belts may be loosened by retrograde rotation of ring 47, while the belts may be removed simply by removing the rings 47 and 45. Spindle 26 is provided with the usual face plate 33 and center 34.

A single control lever 53 is used for selecting the various spindle speeds. As shown at Figures I, II, III, V, Va, VI and VII, this lever is axially and rotatably supported at its rearward end within a bearing in rib 60 of the headstock housing, and at its forward end by a sleeve 54 rotatable and slidable within a bore 65 of boss 56, integral with said housing. Shaft 57 projects through a central axial hole in sleeve 54 and is fixed thereto by means of a pin 59 whereby the shaft and sleeve move as a unit.

A detent 72 is slidable within a bore in housing 8 and is spring-pressed into any one of a series of circumferentially and axially-arranged detents whereby the shaft may be yieldingly held in adjusted position, as will be clear from inspection of Figure VII.

At its rear end, shaft 57 carries a spool 71 within which rides a pin 70 fixed to one end 69 of a bell crank 61. This bell crank is pivoted on a vertical pin 62 extending between bosses 63 and 64 formed at the rear of the headstock housing 8, as will be noted from Figure VI, and its other end 65 shaped as shown at Figures II and VI, extends forwardly and downwardly and terminates in a forked end straddling annular slot 68 in gear 21. The forked ends of the arms have pins 67 on which are pivoted shoes 66, riding in slot 68. By the foregoing construction, as shaft 57 is axially translated by force applied to lever 53, bell crank 61 is pivoted and gear 21 is axiallly slid along shaft 3 to selectively bring about engagement of the various gears thereon with the corresponding gears 12, 13, 14 and 15 fixed with respect to shaft 3.

Shaft 57 has a splined portion 74, Figure VII, on which a correspondingly splined sleeve or shifter 73 is slidable. Sleeve 73 has a downwardly extending yoke 75 with arms straddling gear 27 and portion 28 of shaft 19. Pins 77 are secured in the ends of these arms and pivotally support shoes 76 riding in annular slot 78 of gear 27. Thus, as lever 53 and shaft 57 are rotated, gear 27 is axially translated along shaft 19 to the selected one of its three positions, previously described. In order to indicate the speed selected, a pointer 79 is secured to lever 53 so that its end moves over a chart 80, showing the various speeds determined for each pivotal and axial adjustment of shaft 57 and lever 53. The four axial positions of lever 53 are indicated at 53a, 53b, 53c and 53d, Figure VII. The three radial positions are indicated at 53e, 53f and 53g, Figure I.

A pick off gear 81 is provided for the usual drive to the feed box of the lathe. This gear is fixed upon a shaft 82 journaled in the headstock wall and an adjacent rib portion. The shaft 82 is the feeding shaft or output shaft for the power feed take off for actuating the cutting tool of the lathe through the usual mechanism. In effect this shaft 82, together with the usual lathe mechanism for actuating the tool, comprises the feeding means or the feeding power take off from the headstock to actuate the lathe tool relative to the work spindle. This shaft 82 may take the form of a splined feed shaft by having a splined end upon which a composite gear 85 comprising gears 83, 84 is slidable. A second composite gear 88, having gears 86 and 87 is journaled upon shaft 82. An idler shaft 93 is rotatably mounted on suitable bearings in the headstock housing 8 and has fixed thereto the gears 90 and 91, shown as a composite gear 92. A pinion 89 is also secured to idler shaft 93, the arrangement being such that in one position of composite gear 85, large gear 83 meshes with pinion 89, while in the second position (shown at Figure IV), gears 84 and 90 are in mesh.

A shaft 96 having a splined portion 97 is journaled in bearings in rib portions 8a and 8b, parallel to spindle 26 and separate gears 95 and 112 having splined bores, are mounted thereon. Gear 112 is positioned for engagement and disengagement with gear 90, while gear 95 is positioned for engagement and disengagement with pinion 94 on spindle 26. Thus, when gear 95 is in mesh with pinion 94, feeding power is taken from spindle 26 by way of gear 95, shaft 96, gear 112, gear 90 and gear 84 to shaft 82. Or, of course, if a reduced feeding speed is required, then the feeding drive is from pinion 89 to gear 83 and shaft 82.

However, when gear 27 is in mesh with pinion 37 to effect high speed belt driving, the feeding speeds afforded by way of spindle 26 and pinion 94, as just described, are much too high. Therefore, at this time, we provide a connection whereby reduced feeding speeds are available in proportion to spindle speeds. This connection comprises a gear 111 fixed to the inner end of shaft 96, and in mesh with a gear 109 journaled on a stub shaft 110 fixed in a boss in rib portion 8b. From Figures IV and VII, it will be noted that gear 30, in its extreme leftward position of adjustment, meshes with both pinion 37 and with gear 109. Therefore, at this time, assuming that gear 95 has been moved out of mesh with pinion 94, feeding power is transmitted at speeds much reduced in relation to spindle speeds, by way of gears 30, 109, 111, shaft 96, gears 112, 90, 84 (or 112, 90, 89, 83), to shaft 82.

Reversal of shaft 82 is effected by sliding gear 112 on shaft 96 to cause it to mesh with gear 86 of composite gear 88. Therefore, at this time the drive between shafts 96 and 82 is by way of gears 112, 86, 87, 91, 90 and 84 (or 90, 89, and 83), to shaft 82.

As serious damage to the machine might result from attempting to feed by way of spindle 26 when the spindle is being driven at high speeds from belts 43, we have provided means to automatically assure that gear 95 is separated from pinion 94 and gear 30 is in mesh with gear 109 at all times when high speed belt driving is in effect. For this purpose, we provide a bracket 103, secured to a boss on rib portion 8b by screws 104. See Figures II and III. A shifter lever 101 is pivoted upon a stud 102 carried by bracket 103. This lever has an upwardly extending arm 100, connected by a link 99 to an upwardly-extending arm 98 integral with, or fixedly attached to, shifter sleeve 73. Lever 101 also carries a downwardly-extending arm 105, Figure VI, carrying at its free end a pin 106 upon which a shoe 107 is pivoted. This shoe rides in annular slot 108 of gear 95. Therefore, as lever 53 is moved to rotate shaft 57 and thereby rock shifter 73, lever 101 is pivoted to effect translation of gear 95 upon its shaft 96.

From Figure IV it will be noted that pinion 94 is of substantial length. The parts are so arranged and proportioned, that gear 95 is in mesh with pinion 94 for both positions of adjustment 53e and 53f, Figure I, of lever 53, as indicated in dotted lines upon Figure IV, while moved to the full line position of said figure, by and upon shifting of lever 53 to position 53g. It has been previously explained that, in this position, 53g, gear 30 is in mesh with pinion 37 and gear 109 to effect high speed, spindle driving through belts 43. By this construction feeding power is always transmitted by way of gears 30 and 109 when high spindle speeds are being used and it is impossible to damage the machine by inadvertently leaving pinion 94 and gear 95 in mesh at such times. Meshing of gear 30 with pinion 37 and gear 109 is facilitated by making pinion 37 of somewhat greater axial dimension than gear 109, whereby gear 30 starts to mesh with pinion 37 before engaging gear 109.

Shifting of gear 112 is effected by shifter handle 113 which, as shown at Figure I, is fixed to a shaft 114 journaled at the bottom wall portions of headstock housing 8. An arm 115 is pinned to shaft 114 and extends upwardly adjacent annular groove 117 of gear 112 where it carries a pin 116 riding in said groove. Adjustment of handle 113 in either of its two positions, is maintained by a spring-pressed plunger or detent in said handle entering holes or notches formed in the adjacent portion of housing 8. Movement of this handle 113 therefore shifts gear 112 between positions in which it meshes with gear 90 or gear 86 to effect rotations of shaft 82 in one direction or the other.

For shifting composite gear 85, we have provided a second handle 118 adjacent handle 113. Handle 118 is fixed upon a shaft 119 also journaled in the lower part of headstock housing 8. A shifter arm 120 is pinned to shaft 119 and carries at its free end a pin 121 riding in the annular groove 122 of gear 85. Handle 118 is maintained in either of its two positions by a spring-pressed detent 118a therein, adapted to enter either of two apertures located in the adjacent wall of the headstock housing. By this construction, movement of lever 118 effects shifting of gear 85 to effect the meshing of gears 83 to 89 or 84 to 90 whereby the desired feeding speed of shaft 82 is selected.

In case a positive drive is preferred for the high spindle speeds, the V-belts of Figure V may be replaced by a link-belt drive as shown at Figure Va. In this figure, pulley 44 is replaced by a sprocket 52 and pulley 41 by a sprocket 50, and a link-belt 51 passes over and connects the two sprockets. This construction affords a more positive and substantial drive for spindle 26 and completely eliminates slippage that might occur in taking relatively heavy cuts with the V-belt drive of Figure V.

The operation will be clear from the foregoing description. The machine is adjusted merely by grasping lever 53 and by a combined axial thrust and rocking movement, bringing the end of pointer 79 over the number on plate 80 corresponding to the desired spindle speed. If said speed is within the low or intermediate ranges of spindle speeds, feeding power is transmitted from pinion 94. On the other hand, if a spindle speed within the high speed range is selected, as by movement of lever 53 to position 53g, the feeding drive is automatically disconnected from pinion 94 and effected by way of gears 30 and 109. In either case, low or high feeding speed relatively to the selected spindle speed, may be chosen by movement of handle 118, while the desired direction of feeding rotation of shaft 82 is selected by movement of handle 113.

It will therefore be seen that we have provided a headstock affording a wide range of spindle speeds with feeding speeds automatically correlated therewith so that such feeding speeds are at all times maintained at practicable values and damage to the machine through inadvertent adjustment is rendered impossible.

Referring to Figures VIII and IX, we have shown a modification of the control lever and mounting used in Figures I to VII. In these figures, the headstock housing 8 is formed substantially as in the species of Figures I to VII and a sleeve 127 is journaled within boss 56, being held against axial movement by a collar 126 threadedly engaging the inwardly projecting end of said sleeve, and locked in position thereon by a set screw 127d. At its outer end, sleeve 127 is formed with an enlarged portion that is slotted to form ears 127a and 127b between which control lever 128 is pivoted by a pin 129 passing through aligned holes in the ears and lever, and secured to lever 128, by means of a set screw 130. Lever 128 has a slot 128h formed therein having parallel sides embracing the flattened end of a shaft 131. This shaft has a key 132 slidably engaging an axially-extending keyway 127e formed in sleeve 127, whereby shaft 131 and sleeve 127 are constrained to rotate as a unit but shaft 131 may slide axially relatively to sleeve 127. A packing element 133 is secured within the counterbored inner end of sleeve 127 to effectively seal the inner end of keyway 127e.

The flattened end of shaft 131 has a transverse slot 131a formed therein through which extends a pin 134 passing through and fixed to the adjacent portions of lever 128 whereby angular movement of lever 128 about the axis of pin 129 may be effected to produce a corresponding axial translation of shaft 131. Furthermore, angular movement of lever 128 about the axis of shaft 131 imparts a like movement to sleeve 127.

The several positions of lever 128 in a plane through the axis of shaft 131, are indicated at 128a, 128b, 128c and 128d, Figure IX, and, of course, correspond to the positions 53a, 53b, 53c and 53d of Figure VI, and effect corresponding adjustments of the headstock gears, as previously described. The positions of lever 128 in a plane normal to the axis of shaft 131, are indicated at 128e, 128f and 128g, Figure VIII, and correspond in function to positions 53e, 53f and 53g, previously described for lever 53 in connection with Figures I to VII. Positions 128a to 128d, inclusive, are determined by a series of axially spaced notches 131b formed in shaft 131 and positioned to be engaged by a ball or detent 135 positioned within a radially-extending bore 136 in the enlarged external end of sleeve 127 and urged into the respective notches by a spring 137 engaging at its respective ends a plug 138 closing the end of bore 136, and the ball 135. By this construction shaft 131 is yieldingly held in its various positions of axial adjustment when moved thereto by actuation of lever 128.

Sleeve 127 and shaft 131 are held in their several positions of rotational adjustment by notches 127c circumferentially spaced about the periphery of sleeve 127, and positioned to be engaged by a ball or detent 139 located within a radially-extending bore 140 in the adjacent thickened headstock wall. A compression spring 141 engages at its respective ends, a plug 142 threaded into the end of bore 140 and ball 139, whereby the latter is urged into any one of notches 127c and acts to yieldingly hold sleeve 127 and shaft 131 in the selective rotational positions 128e, 128f or 128g. As shown at Figure IX, the inner end of shaft 131 is drilled at 131c to receive the reduced end 57a of shaft 57. This shaft is identical in function with the shaft 57 of Figures I to VII. After the shafts 57 and 131 are mated and moved to a position, corresponding, for example, to 128a, the two are simultaneously drilled and coupled by a pin 143.

By the foregoing construction, a certain amount of leverage is provided in the axial shifting of shaft 131, while the facing parallel surfaces of ears 127a and 127b provide a large bearing area for the relatively movable contacting surfaces of lever 128 whereby smooth easy operation to all positions of said lever is assured.

As will be noted from Figure IX, an indicator 144 is fixed to a flattened end portion of shaft 131, by a screw 145. The end of this pointer moves over a chart 88, calibrated as shown in Figure II, to give the resulting spindle speed for each corresponding position of adjustment of lever 128.

While we have described the embodiment of our invention as now preferred by us, numerous changes, alterations, and substitutions of equivalents, will be obvious to those skilled in this art. The foregoing description is therefore to be taken in an illustrative, rather than a limiting sense. We desire to reserve all such changes, alterations and substitutions as fall within the scope of the subjoined claims.

Having now fully disclosed our invention, what we claim as new and desire to secure by Letters Patent is:

We claim:

1. In a headstock for lathes, a drive shaft, a spindle, alternative gear and belt drives between said shaft and spindle, a feeding shaft, a first disconnectable drive between said spindle and feeding shaft, a second disconnectable drive between said drive shaft and said feeding shaft, and a single adjustable means for disconnecting said first drive, connecting said second drive and simultaneously shifting from gear to belt drive of said spindle.

2. In a headstock for lathes, a drive shaft, a spindle, a high-speed belt drive between said shaft and spindle, a slower speed gear drive between said shaft and spindle, an output shaft, a first drive between said output shaft and spindle, a second drive between said drive shaft and output shaft exclusive of said spindle, and a single adjustable means to selectively effect gear or belt drive to said spindle and simultaneously render effective said first or said second drives.

3. In a headstock, a spindle, first means to drive said spindle at high speeds, second means to drive said spindle at slower speeds, a power feed take-off means, a first driving connection between said first means and said power feed take-off means, a second driving connection between said second means and said power feed take-off means, and a single means operable to alternatively connect said first means or said second means to said spindle and simultaneously render operative said first or said second driving connection.

4. In a headstock for lathes, a spindle, a drive shaft, an intermediate shaft, change speed gearing connecting said shafts, belt means for driving said spindle, first means selectively operable to connect said intermediate shaft direct to said spindle or to said belt means, and a single operating element adjustable in one plane to operate said change speed gearing and in another plane to operate said first means.

5. In a headstock, a spindle, a drive shaft, an intermediate shaft, change speed gearing connecting said shafts, a pulley shaft, a belt drive between said pulley shaft and said spindle, first means movable to a first position connecting said intermediate shaft to said pulley shaft or a second position directly connecting said spindle and intermediate shaft, a feed power take-off, a first drive from said spindle to said take-off, a second drive from said intermediate shaft to said take-off, and a single manually-operable mechanism to operate said first means to its said first position and simultaneously renders said first drive ineffective and said second drive effective.

6. A headstock comprising, in combination, a spindle, a drive shaft, an intermediate shaft, change speed gearing connecting said shafts, a pulley shaft, belt driving means between said pulley shaft and said spindle, first means on said intermediate shaft shiftable between a first position directly connecting said intermediate shaft and said spindle, and a second position connecting said intermediate shaft to said pulley shaft, and a single adjusting lever operable in one plane to adjust said change speed gearing, and in a second plane to so shift said first means.

7. A headstock comprising, in combination, a spindle, a drive shaft, an intermediate shaft, change speed gearing connecting said shafts, a pulley shaft, belt driving means between said pulley shaft and said spindle, gear means slidable on said intermediate shaft between a first position directly connecting said intermediate shaft and said spindle and a second position connecting said intermediate shaft to said pulley shaft, feeding means, a drive from said spindle to said feeding means operative when said gear means is in said first position, and means operated by and upon movement of said gear means to said second position to disconnect said drive and connect said gear means direct to said feeding means.

8. In a headstock for lathes, a work spindle, a drive shaft, an intermediate shaft, change speed gearing interconnecting said shafts, a pulley shaft, belt drive means interconnecting said intermediate shaft and said spindle, a first gear slidable on said intermediate shaft between a first position in which said gear directly drives said spindle, and a second position in which said gear drives said pulley shaft, a feeding power take-off, including a second gear meshing with said first gear when said first gear is in said second position, a disconnectable drive between said spindle and said take-off, and a single element movable in one direction to actuate said change speed gearing, and in a second direction to shift said first gear and disconnect said disconnectable drive when said first gear is moved to said second position.

9. In a headstock for lathes, an input shaft, an intermediate shaft, change speed gearing interconnecting said shafts, a pulley shaft, a spindle, a pinion, and a gear on said spindle, a pinion on said pulley shaft, belt drive means interconnecting said pulley shaft and said spindle, a splined feed shaft, a first gear on said feed shaft slidable into and out of engagement with said spindle pinion, a second gear fixed to said splined shaft, a gear slidable on said intermediate shaft between a first position meshing with said spindle gear and a second position meshing both with said pinion on said pulley shaft and said second gear, and means simultaneously sliding said intermediate shaft gear to said second position and sliding said first gear out of mesh with said pinion on the spindle.

10. A headstock comprising a spindle, a drive shaft, an intermediate shaft, change speed gearing connecting said shafts, a pulley shaft, belt driving means between said pulley shaft and said spindle, first means on said intermediate shaft shiftable between two positions directly connecting said intermediate shaft and said spindle, and a third position connecting said intermediate shaft to said pulley shaft, a shaft mounted for rotation and axial translation and connected to operate said change speed gearing by axial translation, and said first means by rotation, and a single lever connected to said shaft for actuation thereof to effect all gear and belt drive speed selections for said headstock.

11. In a headstock for lathes having, a work spindle, an input power drive shaft, a change speed transmission driven from said drive shaft, a gear drive transmission interconnectable between said change speed transmission and said spindle, a belt drive transmission interconnectable between said change speed transmission and said spindle, and means for simultaneously adjusting said change speed transmission and connecting or disconnecting said gear and belt drive transmissions relative to said spindle including a single control lever operable to a plurality of different positions to select the complete range of all gear and belt drive speed selections for said headstock.

HAROLD J. SIEKMANN.
ROSS M. BACON.

REFERENCES CITED

The following references are of record in the file of this patent:

UNITED STATES PATENTS

| Number | Name | Date |
|---|---|---|
| Re. 22,085 | Reeves | Apr. 28, 1942 |
| 1,470,050 | Behrend | Oct. 9, 1923 |
| 1,692,918 | Bachman | Nov. 27, 1928 |
| 2,030,097 | Carter | Feb. 11, 1936 |
| 2,135,467 | Metz | Nov. 1, 1938 |
| 2,197,893 | Le Blond | Apr. 23, 1940 |
| 2,338,121 | Le Blond et al. | Jan. 4, 1944 |

FOREIGN PATENTS

| Number | Country | Date |
|---|---|---|
| 519,440 | Great Britain | Mar. 27, 1940 |